United States Patent [19]

Jester

[11] Patent Number: 5,404,772
[45] Date of Patent: Apr. 11, 1995

[54] TRANSMISSION HOUSING

[75] Inventor: Terry L. Jester, Perrysburg, Ohio

[73] Assignee: Dana Corporation, Toledo, Ohio

[21] Appl. No.: 199,983

[22] Filed: Feb. 22, 1994

Related U.S. Application Data

[63] Continuation of Ser. No. 972,590, Nov. 6, 1992, abandoned.

[51] Int. Cl.⁶ ............................................. F16H 57/02
[52] U.S. Cl. ...................... 74/606 R; 74/467
[58] Field of Search .................. 74/606 R, 606 A, 467

[56] References Cited

U.S. PATENT DOCUMENTS

| | | | |
|---|---|---|---|
| 2,968,190 | 1/1961 | Orr | 74/467 |
| 4,151,761 | 5/1979 | Nishikawa et al. | 74/606 |
| 4,193,322 | 3/1980 | Morino et al. | 74/700 |
| 4,242,923 | 1/1981 | Nishikawa et al. | 74/700 |
| 4,302,984 | 12/1981 | Katayama | 74/375 |
| 4,365,523 | 12/1982 | Numazawa et al. | 74/606 |
| 4,528,867 | 7/1985 | Semba et al. | 74/606 |
| 4,602,519 | 7/1986 | Atkins et al. | 74/375 |
| 4,691,802 | 9/1987 | Ishimori et al. | 180/291 |
| 4,951,527 | 8/1990 | Klazura | 74/606 R |
| 5,058,456 | 10/1991 | Manrique et al. | 74/606 R |
| 5,095,773 | 3/1992 | Okuzumi | 74/606 R |
| 5,097,717 | 3/1992 | Bardoll | 74/606 R |
| 5,134,901 | 8/1992 | Grady | 74/606 R |
| 5,176,039 | 1/1993 | Takeuchi et al. | 74/467 |

FOREIGN PATENT DOCUMENTS

| | | | |
|---|---|---|---|
| 4-136559 | 5/1992 | Japan | 74/606 R |
| 1596157 | 9/1990 | U.S.S.R. | 74/606 R |

Primary Examiner—Vinh T. Luong
Attorney, Agent, or Firm—Gifford, Krass, Groh, Sprinkle, Patmore, Anderson & Citkowski

[57] ABSTRACT

A modular transmission housing uses a common front case with a series of rear cases and intermediate bearing support plates. Use of a intermediate bearing support plate permits dividing the main shaft and countershaft into two approximately equal length shafts for a popular seven speed transmission where the rear portion and the front portion of the front and rear shaft portions are supported by bearings in the intermediate bearing support plate. Various transmission sizes such as a five speed, seven speed and ten speed transmission utilizes the common front case for each housing.

13 Claims, 2 Drawing Sheets

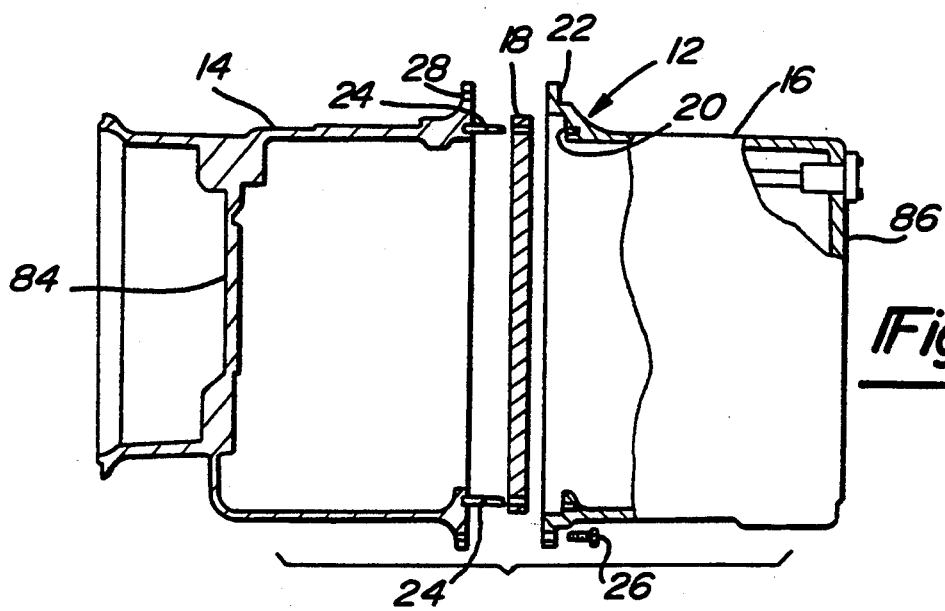
_Fig-2_
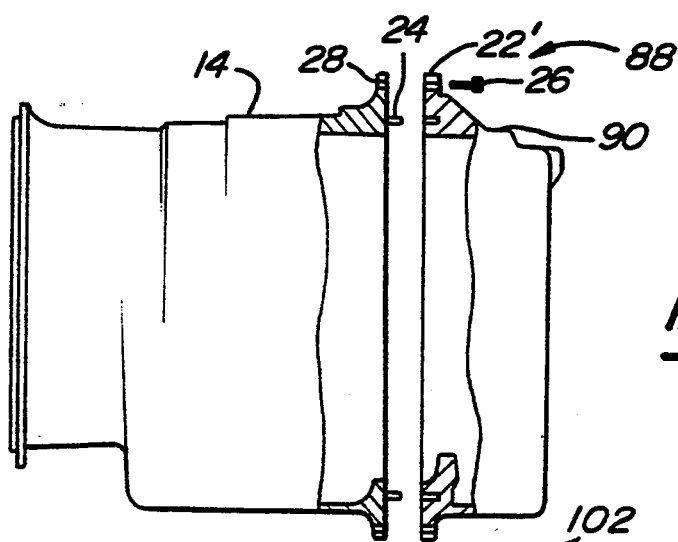
_Fig-3_
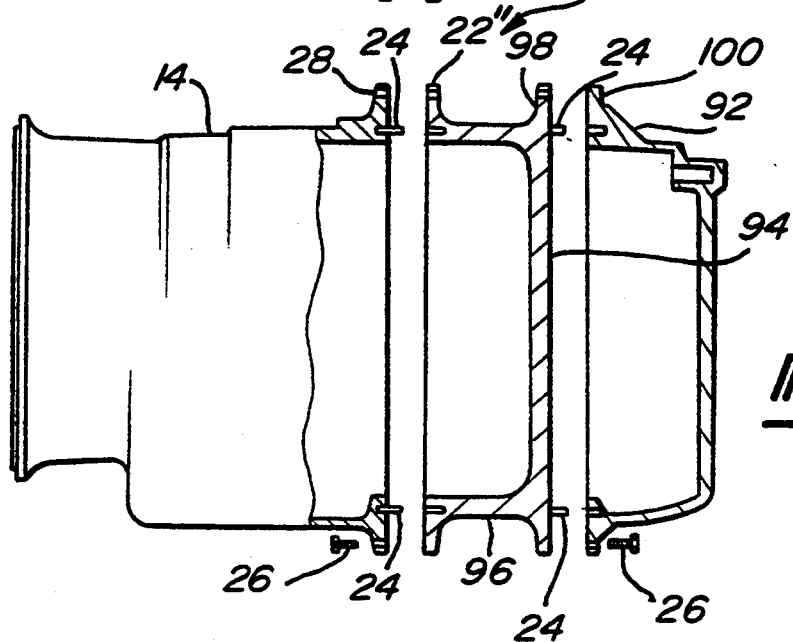
_Fig-4_

TRANSMISSION HOUSING

This is a continuation of application Ser. No. 07/972,590, filed on Nov. 6, 1992, abandoned.

BACKGROUND OF THE INVENTION

1. Field of the Invention

This invention relates to transmission housing, and, more particularly, this invention relates to a modular housing design and means for providing shafts of equal length in a front housing portion and a rear housing portion to reduce shaft deflections and decrease bearing loads.

2. State of the Art

Typically, in large non-range transmissions for heavy duty trucks have two piece main shafts and countershafts because shaft deflections and bearing loads would become unmanageable with single shafts due to overall shaft length and bearing span. A past practice has been to use a separate front and a separate rear transmission case, splitting the shafts between the two cases and mounting bearings at the rear wall of the front transmission case. Unfortunately since the cases are not of equal length, the shaft sections are not equal, again resulting in excess shaft deflection and bearing loads, requiring the use of larger diameter shafts in the larger span and higher capacity bearings. This adds cost and weight to the transmission.

Where a line of transmissions are offered, even with common spacing between main shaft and countershaft but with different torque ratings and speed versions, each transmission must be built with a different single case or different front and rear cases. For example, a five speed and a seven speed without range gearing and a nine or ten speed version using a two speed range gear set all must be separately built.

SUMMARY OF THE INVENTION

The present invention uses a separate intermediate bearing support plate to provide a modular transmission housing and to provide transmission shafts of approximately equal length in a front and a rear case supported at one end by bearings in the intermediate bearing support plate.

The present invention provides a transmission housing which includes a front case and a number of rear cases, each of which is adapted to cooperate with the front case to provide a number of differently sized models of a basic transmission. A number of intermediate bearing support plates are used, each being adapted for use with a selected one of the rear cases to support shafts within the transmission housing. In one embodiment, provision is made for aligning and securing one of the selected rear cases to the front case without the use of an intermediate bearing support plate. In another embodiment provision is made for aligning and securing one of the selected rear cases to the front case with an intermediate bearing support plate between the two to form the transmission housing. Aligning and securing is accomplished by spaced pins for alignment and peripheral end flanges on the front case and the rear case with bolts for securing.

DRAWING

The advantages of the present invention will be more apparent from the following detailed description when considered in connection with the accompanying drawing wherein:

FIG. 2 is an elevational view of the transmission according to FIG. 1 showing only the housing components;

FIG. 3 is an elevational view of a second preferred embodiment showing the housing components for a five speed transmission; and FIG. 4 is an elevational view of a third preferred embodiment showing the housing components for a ten speed transmission.

DETAILED DESCRIPTION OF THE PRESENTLY PREFERRED EMBODIMENTS

Figure 1:
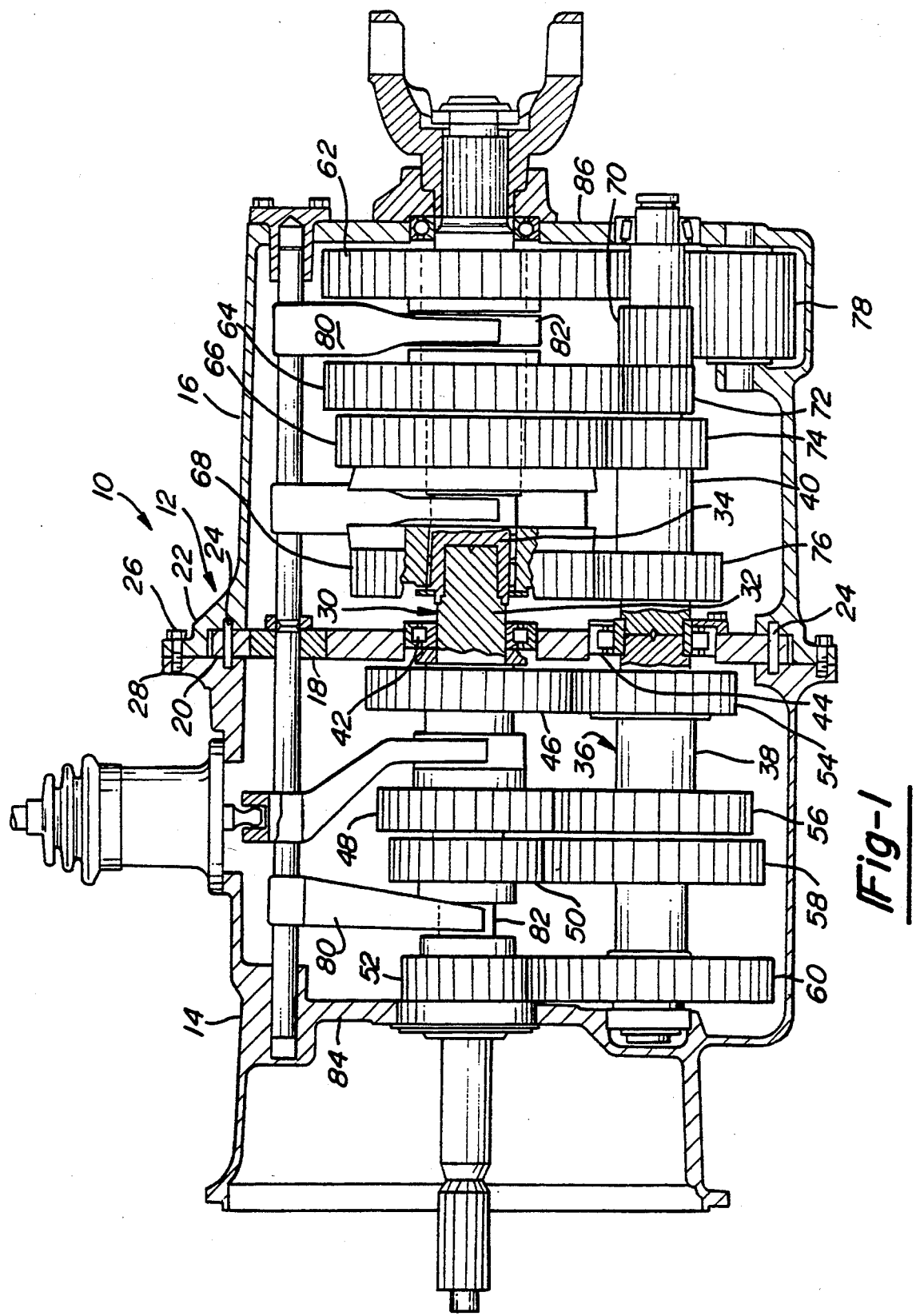
FIG. 1 is an elevational view in cross section of a seven speed transmission embodying the present invention.

The new transmission housing utilizes an intermediate bearing support plate which is a separate plate that is dowelled for precision alignment. With a seven speed transmission, the front and rear transmission cases are cast of approximately equal length and with a large opening in each to receive the plate. With the plate positioned near the center of the total shaft span, and with bearings mounted in the plate to support the rear of the from set of shafts and the front of the rear set of shafts, the bearing radial load capacities and the shaft diameters can be optimized for cost, strength and durability.

With a separate bearing support plate, the design of a series of modular transmissions with a common shaft center distance is facilitated. That is, the same front case or housing portion that was used for the seven speed transmission mentioned above can be used for a five speed version of the transmission by omitting the intermediate bearing support plate and bolting on a different rear case with its different gearing and shafts. The five speed transmission has a much shorter shaft and bearing span so that it does not require an intermediate bearing support.

Similarly, a nine or ten speed version of the same basic transmission can be designed by using a variation of the intermediate bearing support plate with the same front case and a new rear case to contain a two speed, range change gear set.

Referring to FIG. 1, a seven speed transmission 10 is shown having a housing 12 which includes a front housing portion 14 and rear housing portions 16. An intermediate bearing support plate 18 is located in a recess 20 of flange 22 of rear housing portion 16. Dowel pins 24 accurately locate the intermediate bearing support plate 18 relative to the front housing portion 14 and rear housing portion 16. The rear housing portion 16 is secured to the front housing portion 14 by bolts 26 passing through their respective flanges 22 and 28. Main shaft 30 is split into two approximately equal sections, from section 32 and rear section 34. Likewise, countershaft 36 is split into approximately equal sections, front section 38 and rear section 40. Main shaft 30 and countershaft 36 are supported at their mid points by bearings 42 and 44 located in intermediate support plate 18. That is, the rear end of main shaft front section 32 and the from portion of rear main shaft section 34 are supported in bearing 42 with the main shaft sections being splined together, and the rear end of from countershaft section 38 and the front end of rear countershaft section 40 are supported in bearing 44 also being splined together.

Front main shaft section 32 carries the fourth, fifth, sixth and seventh main shaft speed change gears 46, 48, 50 and 52 which mesh respectively with the fourth, fifth, sixth and seventh countershaft speed change gears 54, 56, 58 and 60 respectively. Rear main shaft section 34 carries the reverse, first, second and third main shaft speed change gears 62, 64, 66 and 68 respectively. Rear countershaft section 40 carries reverse, first, second and third countershafts speed change gears 70, 72, 74 and 76 which mesh with gears 62, 64, 66 and 68 respectively, reverse gear 70 meshing through idler gear 78 with main shaft reverse gear 62. Selection of the main shaft gear which is engaged with the main shaft is made through forks 80 and clutch collars 82 as is well known in the art. Because main shaft 30 and countershaft 36 is supported at the mid point of the housing 12 by intermediate support plate 18, the radial load capacity and shaft diameters have been optimized along with the bearings 42 and 44 for cost, strength and durability.

For comparison purposes, FIG. 2 shows the housing 12 components of the seven speed transmission 10 of FIG. 1. It can be clearly seen that the intermediate bearing support plate 18 is situated approximately at the middle of the total transmission span, and that front case is approximately the length of the rear case with respect to front bearing wall 84 of front casing 14 and rear bearing wall 86 of rear casing 16.

FIG. 3 illustrates a transmission housing 88 for a second embodiment of the rear case for five speed transmission which includes a front case 14 which is the same as the front case 14 of the seven speed transmission shown in FIGS. 1 and 2. Since the live speed transmission has a much shorter bearing and shaft span, the intermediate bearing support plate is not necessary so that the rear case 90 is aligned with pins 24 and flange 22' is bolted directly to flange 28 of the front case. Front case 14 will contain speed change gears two through five, and the rear case 90 will contain speed change gears one and reverse.

FIG. 4 shows a third embodiment of the rear case for a ten speed transmission in which the housing 102 includes the same front case 14 as the seven and five speed transmissions of FIGS. 1-3 with a rear range transmission case 92. Here the intermediate spacer or bearing support plate 94 has a forward flange 22" which is aligned with dowel pins 24 with front case 14, and the forward flange 22" is bolted to front case flange 28. The intermediate plate 94 has a cylindrical body portion 96 and a rear flange 98 which is aligned with dowel pins 24 and bolted to the rear case flange 100. The rear case 92 will contain a two speed, range change gear set while the five meshing speed change gears of the front case 14 will alternately be the fifth through reverse speed change gears and the tenth through the sixth speed change gears.

Thus it will be seen from the forgoing comparison of FIGS. 2 through 4 that a modular transmission housing design has been presented with a common front case 14 utilizing different rear cases 16, 90 and 92 with or without an intermediate bearing support plate 18 or 94. A cost advantage of this modular design over conventional practice of making separate front and rear casings for each different speed transmission is apparent.

I claim:

1. A set of interchangeable transmission housings comprising:
   a front case;
   a plurality of differently sized rear cases, each of said plurality of rear cases being adapted to cooperate with said front case to provide a plurality of differently sized models of a basic transmission;
   at least one intermediate bearing support plate, said intermediate bearing support plate being adapted for use with at least one of said plurality of rear cases so as to support shafts within said transmission housing formed thereby; and
   means for aligning and securing a selected one of said plurality of rear cases to said front case to form a first transmission housing and an other selected one of said plurality of rear cases to said front case with said intermediate bearing support plate between said front case and said other selected rear case to form a second transmission housing.

2. The set according to claim 1 wherein said means for aligning and securing includes spaced pins for alignment and peripheral end flanges on said front case and said plurality of rear cases with bolts for securing.

3. The set according to claim 2 wherein said intermediate bearing support plate is recessed within said other selected one of said rear cases, and the peripheral end flange on said front case is in abutment with the peripheral end flange on said other selected one of said rear cases with bolts securing said flanges together to form said second transmission housing.

4. The set according to claim 3 wherein in said second transmission housing, said front case and said other selected rear case are of approximately equal length so that bearings carried by said intermediate bearing plate support the rear of a front set of shafts and the front of a rear set of shafts, said front and rear sets of shafts being of approximately equal span.

5. The set according to claim 1 further including a second intermediate bearing support plate between said front case and said selected one of said rear cases forming said first transmission housing.

6. The transmission housing according to claim 1 wherein said intermediate bearing support plate has spaced peripheral end flanges with one of said plate flanges being in abutment with said peripheral end flange on said front case with bolts securing said flanges together, and the other of said plate flanges being in abutment with the peripheral end flange on said other selected one of said rear cases with bolts securing said flanges together.

7. A set of interchangeable transmission housings comprising:
   a front case;
   a set of differently sized rear cases each adapted to cooperate with said front case to provide a plurality of differently sized models of a basic transmission; and
   means for aligning and securing a selected one of said different sized rear cases to said front case to form said transmission housing for a specific sized model of the basic transmission.

8. The transmission housing according to claim 7 wherein said means for aligning and securing includes spaced pins for alignment and peripheral end flanges on said front case and said rear cases with bolts for securing.

9. The transmission housing according to claim 8 wherein said selected one of said rear cases is secured to said front case with an intermediate bearing support plate between said selected one of said rear cases and said front case.

10. The transmission housing according to claim 9 wherein said intermediate bearing plate is aligned relative to said front case and said selected one of said rear cases with pins.

11. The transmission housing according to claim 10 wherein said intermediate bearing support plate is recessed within said selected one of said rear cases, and the peripheral end flange on said front case is in abutment with the peripheral end flange on said selected one of said rear cases with bolts securing said flanges together.

12. The transmission housing according to claim 11 wherein said front case and said selected rear case are of approximately equal length so that bearings carried by said intermediate bearing plate support the rear of a front set of shafts and the front of a rear set of shafts of approximately equal span as said front set of shafts.

13. The transmission housing according to claim 12 wherein said intermediate bearing support plate has spaced peripheral end flanges with one of said plate flanges being in abutment with said peripheral end flange on said front case with bolts securing said flanges together, and the other of said plate flanges being in abutment with the peripheral end flange on said other selected one of said rear cases with bolts securing said flanges together.

* * * * *

UNITED STATES PATENT AND TRADEMARK OFFICE
CERTIFICATE OF CORRECTION

PATENT NO. : 5,404,772
DATED : April 11, 1995
INVENTOR(S) : Terry L. Jester

It is certified that error appears in the above-indentified patent and that said Letters Patent is hereby corrected as shown below:

Column 2, line 26, delete "from" and insert --front--.

Column 2, line 63, delete "from" and insert --front--.

Column 2, line 66, delete "from" and insert --front--.

Column 3, line 28, after "a" insert --second embodiment of the rear case for --.

Column 3, line 29, delete --second embodiment of the rear case for--.

Column 3, line 32, delete "live" and insert --five--.

Column 4, claim 7, line 56, "different" should be --differently--.

Column 6, claim 13, line 4, "12" should be --10--.

Signed and Sealed this

Fourth Day of June, 1996

Attest:

BRUCE LEHMAN

*Attesting Officer*   *Commissioner of Patents and Trademarks*